S. Pendleton,
Fish Hook,
Nº 5,255.  Patented Aug. 21, 1847.
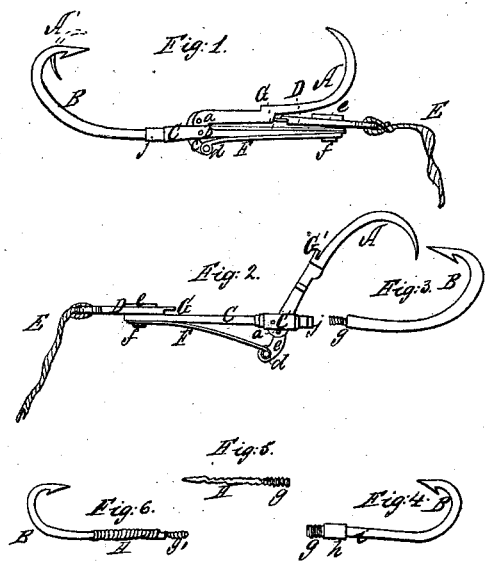

UNITED STATES PATENT OFFICE.

STANTON PENDLETON, OF NEW HAVEN, CONNECTICUT.

IMPROVEMENT IN FISH-HOOKS.

Specification forming part of Letters Patent No. 5,255, dated August 21, 1847.

*To all whom it may concern:*

Be it known that I, STANTON PENDLETON, of the town of New Haven, in the county of New Haven and State of Connecticut, have invented a new and useful Improvement in the Spring Fish-Hook claimed to have been invented by George W. Griswold, of Pottersville, in the State of New York, some two years since, it being the same invention for which a patent was granted to Theodore F. Engalbrecht and George F. Skiff, of Philadelphia, Pennsylvania, by Letters Patent dated July 28, 1846, by the name, I believe, of the "sockdolager" hook; and I do hereby declare that the following is a full, clear, and exact description of the said spring fish-hook and of my improvement thereon, reference being had to the accompanying drawings, which make a part of this specification, in which—

Figure 1 represents the whole of the spring fish-hook as claimed to be invented and patented as before described. Fig. 2 represents the stock or bar, (to the point *j*, Fig. 1,) sliding bar or piece D, spring, striking-hook, &c., without the continuation or extension of the stock or bar which forms the barbed hook B, Fig. 1. Fig. 3 represents a common fish-hook with a male screw cut on the end of the shank, ready to be attached to the stock or bar C, Fig. 2, at *j*. Fig. 4 represents a cylindrical piece of metal, *g h i*, on the end *g* of which a male screw is cut to attach it to the stock or bar C, Fig. 2, at *j*, and at the other end, *i*, a female screw is cut, of smaller caliber, to receive the male screw to be cut on the end of the shank of a small hook, as it now appears. Fig. 5 represents a bar of metal, to which a common fish-hook may be attached with twine or other material in the common way of tying on a hook. On one end, *g*, of this bar a male screw is cut, to attach it to the stock or bar C, Fig. 2, at *j*, and the body of the bar H is scored or notched to hold the twine, &c. Fig. 6 represents a hook tied onto the bar, Fig. 5.

The spring fish-hook or sockdolager-hook before mentioned is constructed by making a stock or bar of steel, as seen at C, Figs. 1 and 2, which is extended downward and curved or bent to form the barbed hook B, Fig. 1, to which the bait is to be attached. Through the body of the stock or bar C, Figs. 1 and 2, a mortise or slot is cut, into which the end of the shank of the striking-hook A, Figs. 1 and 2, is secured by a pin, *b*, Figs. 1 and 2, which passes through a hole in the heel or backside projection of the shank of the striking-hook, which pin holds it in such a manner as to allow it to have a free motion, so that it can easily be drawn up to the position as seen at A, Fig. 1, and also to be thrown down, when released, to the position seen at A, Fig. 2, and as indicated by the dotted lines A', Fig. 1, by the action of the spring F, Figs. 1 and 2, operating on the pin *a*, Figs. 1 and 2, of the lever *c*, Figs. 1 and 2, which lever is attached to the shank of the striking-hook by means of a pin, *a*, Figs. 1 and 2.

When the barbed hook B, Fig. 1, is to be baited for use, the striking-hook A, Figs. 1 and 2, is to be drawn up so that its shank will rest against and along the stock or bar C, Figs. 1 and 2, where it is to be secured in its position by a sliding bar or piece, D, Figs. 1 and 2, the lip of which passes into a slot or span, G', Figs. 1 and 2, in the shank of the striking-hook, as seen at G', Fig. 1. The line or cord is attached to the upper end of this sliding bar or piece D, Figs. 1 and 2, as seen at E, Figs. 1 and 2.

When the fish takes hold of the bait on the barbed hook B, Fig. 1, the pulling on the line or cord E, Figs. 1 and 2, draws up the sliding bar or piece D, Figs. 1 and 2, so that the lip of the sliding bar or piece is disengaged from the slot or span G', Figs. 1 and 2, when the spring F, Figs. 1 and 2, acting on the lever *c*, Figs. 1 and 2, brings down the striking-hook A, Figs. 1 and 2, into the position seen at A, Fig. 2, and as represented by the dotted lines at A', Fig. 1, with sufficient force to penetrate the head of the fish so as to secure him, even when the point of the barbed hook B, Fig. 1, is not in the fish's mouth.

My improvement consists in attaching at pleasure the common fish-hook, of any required size or kind, to the stock or bar of the spring fish-hook or sockdolager-hook, instead of having the stock or bar C, Figs. 1 and 2, extended to form the barbed hook B, Fig. 1. I make the stock or bar, &c., as seen in Fig. 2, thus extending the stock or bar C, Fig. 1, only to *j*, Fig. 2, in the end of which I drill a hole and cut a female screw. Then, by means of a male screw cut on the shank of the common fish-hook, as seen at *g*, Fig. 3, I attach the hook to the bar or stock, as appears in Fig. 1, taking care to cut off the shank of the hook to the proper length. Or, for a smaller hook, I attach a cylindrical piece of metal to the stock or bar by means of a male screw, the same as above, and in the lower end, $i$, Fig. 4, I cut a female screw suitable to receive the male screw of a small hook, as seen at $g\ h\ i$, Fig. 4. Or, for any size or kind of hook, I cut a male screw on one end, $g$, of a small bar of metal, H, Fig. 5, which I attach to the stock or bar as before, and tie or attach the hook to the body H of the bar, Fig. 5, in the common way of attaching a hook to a line, or a snood or snell, as seen in Fig. 6, or in any other convenient way, by a screw, spring and catch, or other means by which I may be able to attach, detach, or change the hook at pleasure.

The advantages of my improvement over the present mode consist in allowing of the stock or bar being made of alloy or composition metal, which is much easier to work than steel, of which the stock or bar must be made when the barbed hook B, Fig. 1, is of the same piece with the stock or bar C, Figs. 1 and 2. Second, one stock or bar, with the striking-hook, &c., is sufficient for any one, however many sizes or kinds of hooks he may have occasion to use, as he can change them at pleasure. Third, should the barbed hook B, Fig. 1, get broken, then the whole will be lost; but with my improvement it would be but the loss of a common fish-hook, which can be as easily replaced as a hook on a common fish-line. Thus the convenience is much greater and the expense less to use my improvement than the original invention; and I do hereby disclaim all and every part of the apparatus claimed to have been invented by the said Griswold, and as patented by the said Engalbrecht and Skiff.

What I claim as my invention, and desire to secure by Letters Patent, is—

The attaching of the common fish-hook to the spring fish-hook claimed to have been invented by the said Griswold, or the sockdolager-hook patented by the said Engalbrecht and Skiff, before described, by means of a screw, spring and catch, or by any other convenient method, so as to be readily attached, detached, or changed at pleasure, in manner and form substantially as herein described.

STANTON PENDLETON.

Witnesses:
   THOS. BENNETT,
   R. FITZGERALD.